United States Patent
Finke et al.

(10) Patent No.: US 6,848,653 B2
(45) Date of Patent: Feb. 1, 2005

(54) OPERATING AND/OR DISPLAY UNIT FOR VEHICLES

(75) Inventors: Christian Finke, Bielefeld (DE); Rolf Broelemann, Salzkotten (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 0 days.

(21) Appl. No.: 10/434,157

(22) Filed: May 9, 2003

(65) Prior Publication Data

US 2004/0000616 A1 Jan. 1, 2004

Related U.S. Application Data

(60) Provisional application No. 60/379,051, filed on May 10, 2002.

(30) Foreign Application Priority Data

May 10, 2002 (DE) .......................... 102 20 806

(51) Int. Cl.[7] .............................. B64D 11/00
(52) U.S. Cl. .................................... 244/118.5
(58) Field of Search ............................. 244/118.5, 119; 361/600

(56) References Cited

U.S. PATENT DOCUMENTS

| | | | | |
|---|---|---|---|---|
| 3,330,506 A | * | 7/1967 | Robillard et al. | 244/118.5 |
| 4,685,035 A | * | 8/1987 | Nanjoh | 361/829 |
| 5,347,434 A | | 9/1994 | Drake | |
| 5,383,318 A | * | 1/1995 | Kelley et al. | 52/287.1 |
| 5,529,265 A | * | 6/1996 | Sakurai | 244/118.5 |
| 5,707,028 A | * | 1/1998 | Roeper | 244/118.5 |
| 5,921,402 A | * | 7/1999 | Magenheimer | 211/26 |
| 6,362,951 B1 | * | 3/2002 | Moribe et al. | 361/600 |
| 6,489,565 B1 | * | 12/2002 | Krietzman et al. | 174/101 |
| 6,619,588 B2 | * | 9/2003 | Lambiaso | 244/118.5 |

* cited by examiner

Primary Examiner—Tien Dinh
(74) Attorney, Agent, or Firm—Birch, Stewart, Kolasch & Birch, LLP

(57) ABSTRACT

The operating and/or display unit for installation above the seats in vehicles, in particular in aircraft, is provided with a ceiling-mounted element (24) having a front and a rear side (26,28), operating elements (18,22) and/or optical display elements arranged on the ceiling-mounted element (24), at least one electric and/or electronic component arranged on the rear side (28) of the ceiling-mounted element (24), and a covering hood (32) adapted to be attached to the rear side (28) of the ceiling-mounted element (24) and to cover the component. The covering hood (32) comprises projecting hook elements (40,42) for clampingly holding an electric cable (34), and a cable passage (36). The hook elements (40,42) are arranged side by side, and a plurality of hook elements (40,42) face in opposite directions relative to each other. Two adjacent hook elements (40,42) facing in opposite directions are offset to obtain an undulating cable routing.

7 Claims, 2 Drawing Sheets

OPERATING AND/OR DISPLAY UNIT FOR VEHICLES

This application claims priority on provisional Application No. 60/379,051 filed on May 10, 2002, and the entire contents of which are hereby incorporated by reference under 35 U.S.C. § 119(a) on Patent Application No(s). 102 20806.9 filed in Germany on May 10, 2002 which is (are) herein incorporated by reference.

BACKGROUND OF THE INVENTION

1. Field of the Invention

The invention relates to an operating and/or display unit for installation above the seats in vehicles, in particular in aircraft.

2. Description of Related Art

In vehicles, and in particular in touring buses and aircraft, various operating and/or display elements are arranged above the seats, said elements serving e. g. for ventilation, illumination and calling of the crew members. These operating and/or display units normally comprise a ceiling-mounted element whose front side is directed towards the ceiling-mounted element various operating elements and/or various optical display elements are arranged, while on the rear side of the ceiling-mounted element at least In aircraft, operating and/or display units of the type described above are also referred to as so-called passenger service units (PSU). Above these units there is a free space which, towards the outside of vehicle cabin, is thermally coupled to the outer skin of the aircraft. Thus condensate may form in the interspace or the free space since the outer skin of the aircraft is exposed to extremely low temperatures during the flight, which leads to condensation of the air and thus to dripping water formation. To prevent the dripping water from affecting the electronic system arranged on the rear side of the ceiling-mounted element, the circuit board is covered by a covering hood (also referred to as dripping water-proof roof). An electric cable extends through an opening in the covering hood, said cable being electrically connected with a manifold. The cable is electricall connected with the circuit board via a plug.

During installation and/or maintenance of an aircraft unintended loosening of the cable plugs from the counterparts on the circuit board may occur. This prolongs the installation and maintenance time and affects the functioning of the PSU.

Cable passages and fasteners are e. g. known from U.S. Pat. No. 3,330,506 A; U.S. Pat. No. 5,707,028 A; U.S. Pat. No. 5,347,434 A; EP 716 014 A1; DE 100 01 846 A1.

SUMMARY OF THE INVENTION

It is an object of the invention to provide an operating and/or display unit for installation above the seats in vehicles, where the cable routing is improved.

According to the invention, this object is achieved with an operating and/or display unit for installation above the seats in vehicles, and in particular for installation in aircraft, the unit comprising:

- a ceiling-mounted element having a front and a rear side,
- operating elements and/or optical display elements arranged on the ceiling-mounted element,
- at least one electric and/or electronic component (e. g. a circuit board with a roof) arranged on the rear side of the ceiling-mounted element, and
- a covering hood adapted to be attached to the rear side of the ceiling-mounted element and cover the component, wherein the covering hood (in particular on at least one of its outer faces) comprises projecting hook elements for clampingly holding an electric cable, and a cable passage,
- wherein the hook elements are arranged side by side, and a plurality of hook elements face in opposite directions relative to each other, and
- wherein two adjacent hook elements facing in opposite directions are offset for obtaining an undulating cable routing.

According to the invention it is provided that the cable is routed in the hook elements on the outside of the covering hood. The hook elements are arranged side by side and face in opposite directions relative to each other. Two adjacent hook elements each are open towards opposite directions and offset from each other such that an undulating cable routing having offset portions is created.

This undulating cable routing ensures a strain relief of the cable on the covering hood. Thus the plug on the cable is protected against tensile load and can no long work loose from the counterplug as a result of the tensile forces acting upon the cable. Further, the cable routing on the covering hood ensures that during installation and/or maintenance of the aircraft no objects can unintentionally get tangled with the cables.

To be able to use the same covering hoods for the operating and/or display units on the right and left rows of seats, it is appropriate if on both sides of the cable passage of the covering hood the latter is provided with hook elements. In this connection it is particularly advantageous if the covering hood is of symmetrical configuration with regard to hook arrangement and cable routing as well as cable passage. For example, the cable passage is arranged in the middle of an outer face of the covering hood. In this case, hook elements arranged symmetrically relative to each other are located on both sides of the cable passage.

BRIEF DESCRIPTION OF THE DRAWINGS

Hereunder the invention is described in detail on the basis of an embodiment with reference to the drawing in which.

DETAILED DESCRIPTION OF A PREFERRED EMBODIMENT OF THE INVENTION

Figure 1:
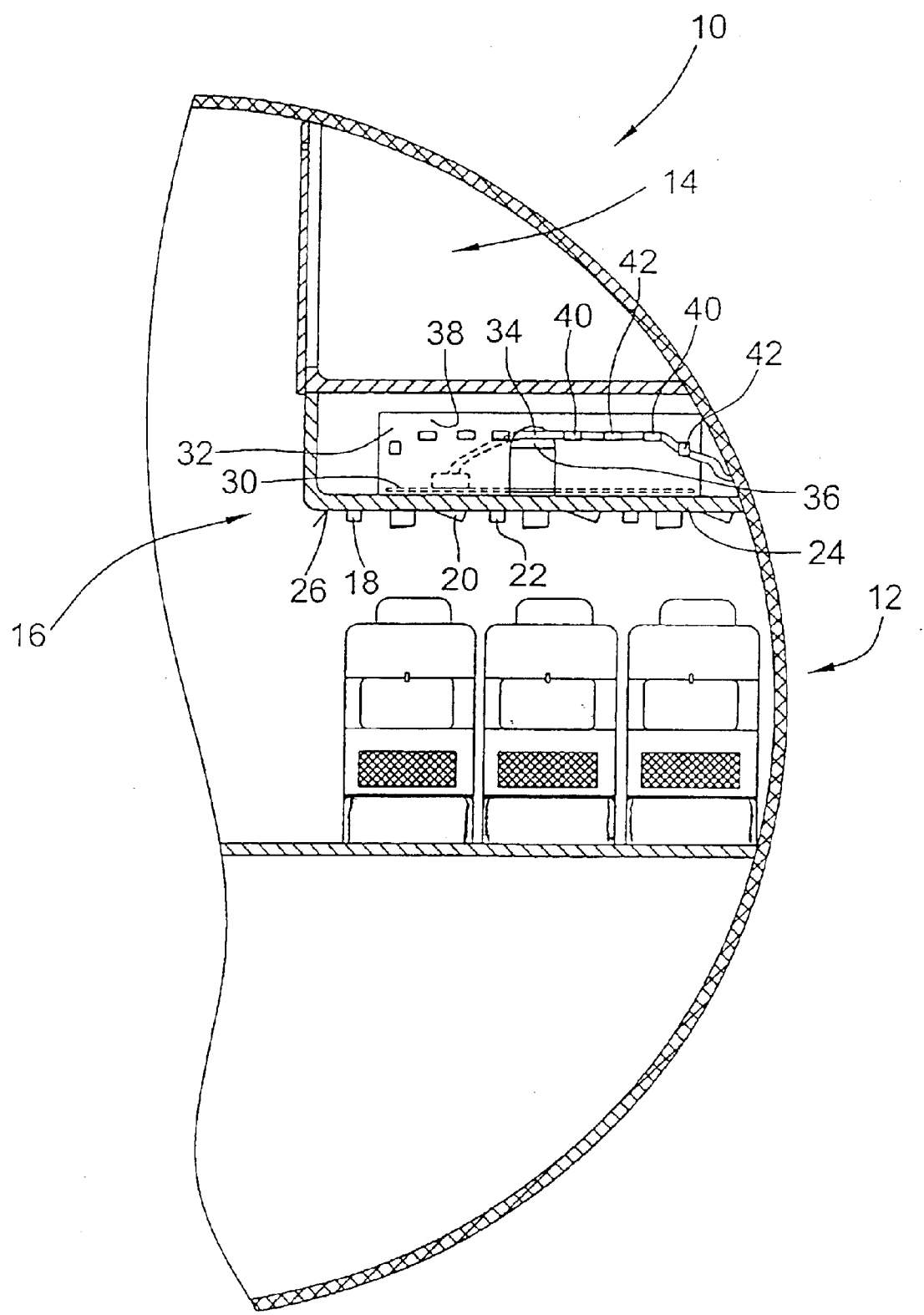
FIG. 1 shows a cutout view of a portion of an aircraft cabin with a row of seats and a passenger service unit (PSU) arranged above the seats.

FIG. 1 shows a cutout view of an aircraft cabin 10. In FIG. 1 a row of seats 12 can be seen above which deposition shelf compartments 14 are arranged. Below the deposition shelf compartments 14 and thus above the row of seats 12 an operating and/or display unit 16 (PSU) is located. This unit 16 is provided, inter alia, with operating elements 18 for e. g. adjusting the fresh air supply as well as lamps 20 and keys 22 for calling the crew members. These elements are integrated in a ceiling-mounted element 24 whose front side 26 faces downwards.

On the rear side 28 oft the ceiling-mounted element 24 a circuit board 30 is arranged which is equipped with electric and/or electronic elements. Near the circuit board the rear side 28 is covered with a covering hood 32 which is also referred to as dripping water-proof roof. The cable 34 required for electrical connection of the circuit board 30 is routed through an opening 36 in one of the side walls 38 of the covering hood 32. On the outside 38 the cable passage 36 is hooked onto first and second hook elements 40,42.

Figure 2:
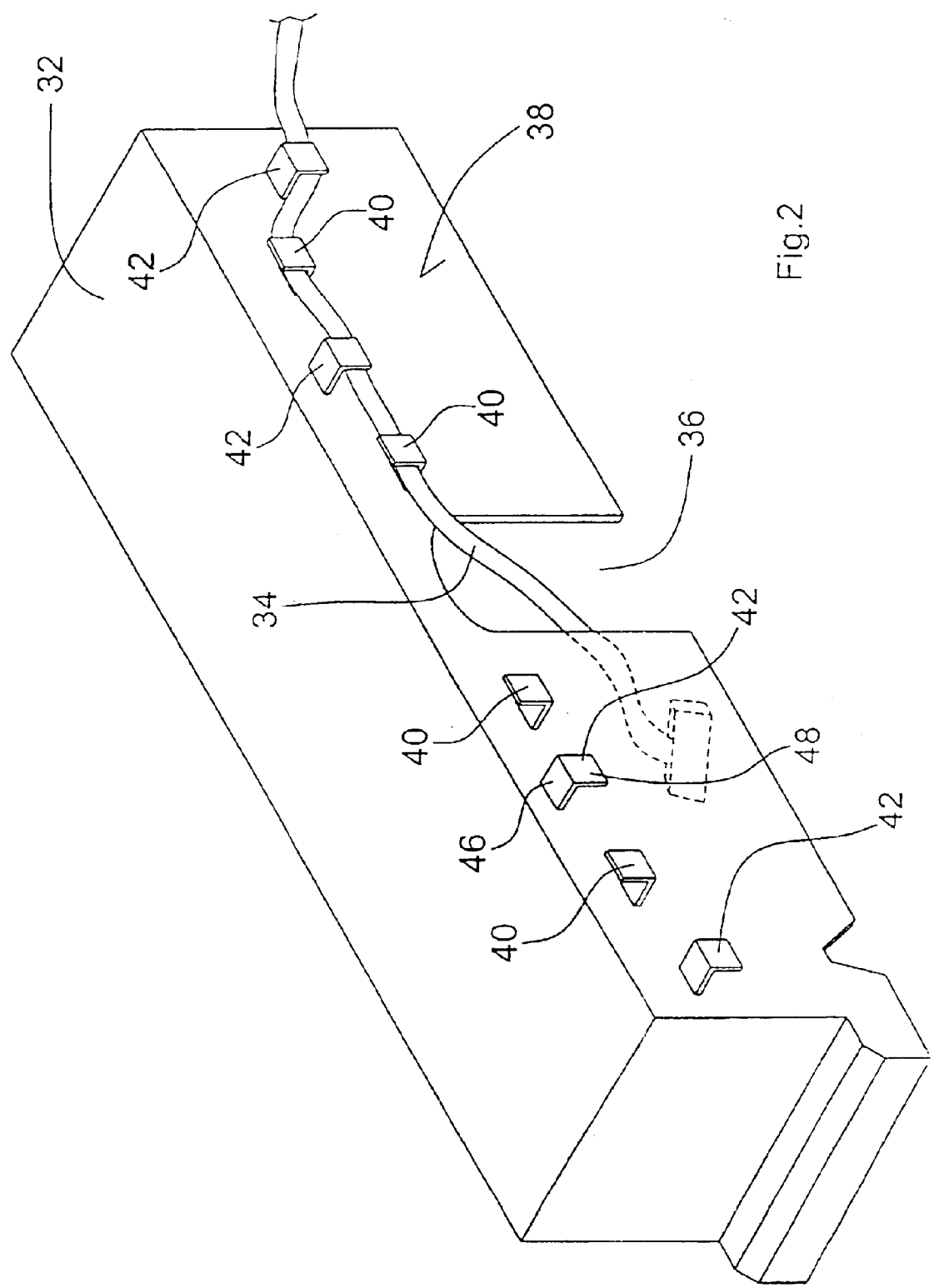
FIG. 2 shows a perspective view of the covering hood (dripping waterproof roof) used for the PSU shown in FIG. 1.

An enlarged perspective view of the covering hood 32 is shown in FIG. 2. It can be seen that the cable 34 extends through the cable passage 36 arranged in the middle of the outside 38. While the first hook elements 40 are open towards the top, the second hook element 42 are open towards the bottom. Two adjacent hook elements 40,42 each are offset in height relative to each other such that, on the whole, an undulating cable routing effecting strain relief is created. On both sides of the cable passage 36 two pairs of first and second hook elements 40,42 each are symmetrically arranged. Thus the covering hood 32 can be used for both the left and the right row of seats of the aircraft, wherein in the one case the cable 34 extends from the cable passage 36 to the one side, and in the other case to the othe side.

As can be seen in the figures, the hook elements 40,42 are configured as right-angled projections extending from the outside 38, said projections comprising a first leg 46 essentially extending at a right angle from the outside 38, and a second leg 48 extending essentially at a right angle to the first leg 46 and thus extending essentially parallel to the outside of the side wall 38. The hook elements 40,42 clampingly hold the cable 34.

Due to the undulating cable routing the cable is on the one hand strain-relieved and extends, properly laid, along the outside 38 of the covering hood 32.

Although the invention has been described and illustrated with reference to a specific illustrative embodiment thereof, it is not intended that the invention be limited to this illustrative embodiment. Those skilled in the art will recognize that variations and modifications can be made without departing from the true scope of the invention as defined by the claims that follow. It Is therefore intended to include within the invention all such variations and modifications as fall with in the scope of the appended claims and equivalents thereof.

What is claimed is:

1. A passenger service unit for installation above seats in vehicles, the passenger service unit comprising:

a ceiling-mounted element having a front and a rear side;

operating elements and/or optical display elements arranged on the front side of the ceiling-mounted element;

at least one electric component arranged on the rear side of the ceiling-mounted element; and a covering hood adapted to be attached to the rear side of the ceiling-mounted element and cover the electric component, wherein the covering hood comprises projecting hook elements for clampingly holding an electric cable, and a cable passage, wherein the hook elements are arranged side by side, and a plurality of hook elements face in opposite directions relative to each other, and wherein at least one hook element is offset for obtaining an undulating cable routing.

2. The passenger service unit according to claim 1, wherein on the covering hood on both sides of the cable passage hook elements are arranged.

3. The passenger service unit according to claim 1, wherein the cable passage and the hook elements are arranged symmetrically to a symmetry line extending along a side wall of the covering hood.

4. The passenger service unit according to claim 1, wherein the vehicle is an aircraft.

5. The passenger service unit according to claim 1, wherein the electric component is a circuit board.

6. The passenger service unit according to claim 1, wherein the hook elements are arranged to alternately face in opposite directions.

7. A passenger service unit comprising:

a covering element being fixedly mounted above passenger seats of an aircraft for containing user adjustable operating controls, the covering element having a front side and a rear side, the front side facing the passenger seats and the rear side supporting electrical components that are electrically connected with the user adjustable operating controls;

a covering hood being fixedly positioned on a portion of the rear side of the covering element for covering and protecting the electrical components provided on the rear side of the covering element, the covering hood having a substantially elongated rectangular form and an aperture provided therein for receiving an electrical cable that is electrically connected with the electrical components; and a plurality of hook elements fixedly attached to a side of the covering hood, the side of the covering hood extending in a plane that is substantially perpendicular to the rear side of the covering element, each of the plurality of hook elements having a receiving area provided thereon so as to support a diameter of the electrical cable in the receiving area, each of the plurality of hook elements being arranged on the side of the covering hood so that the receiving area of each of the plurality of hook elements is alternatively arranged with respect to an adjacent hook element so that the receiving area of the adjacent hook element faces the rear side of the covering element.

* * * * *